United States Patent [19]

Takahashi

[11] Patent Number: 5,142,517
[45] Date of Patent: Aug. 25, 1992

[54] FOCUS ADJUSTMENT SYSTEM FOR OPTICAL DISK APPARATUS

[75] Inventor: Masahiro Takahashi, Tokyo, Japan

[73] Assignee: Oki Electric Industry Co., Ltd., Tokyo, Japan

[21] Appl. No.: 561,948

[22] Filed: Aug. 2, 1990

[30] Foreign Application Priority Data

Aug. 7, 1989 [JP] Japan .................................. 1-204517

[51] Int. Cl.⁵ .............................................. G11B 7/00
[52] U.S. Cl. ........................... 369/44.34; 369/44.25; 250/201.5
[58] Field of Search ................... 250/201.5; 358/342; 369/44.34, 44.41, 44.25

[56] References Cited

U.S. PATENT DOCUMENTS

| 4,503,324 | 3/1985 | Yokota | 369/44.35 X |
| 4,786,794 | 11/1988 | Doi | 369/44.25 X |

FOREIGN PATENT DOCUMENTS

| 0171816 | 2/1986 | European Pat. Off. . |
| 0304932 | 3/1989 | European Pat. Off. . |
| 39123/1978 | 10/1978 | Japan . |
| 9086/1984 | 2/1984 | Japan . |

OTHER PUBLICATIONS

"Three-Dimensional Control of the Light Beam Spot Position for Reproduction of Information"; Hajme Nishikawa; Nikkei Mechanical; Apr. 25, 1983; pp. 126-130.

*Primary Examiner*—Robert L. Richardon
*Attorney, Agent, or Firm*—Spencer, Frank & Schneider

[57] ABSTRACT

A focus adjustment system for an optical disk apparatus has a monitor detector that detects the power of a light beam emitted from a laser, and a peak detector produces a peak-detect signal when peak beam power is detected. An optical system directs the light beam through an objective lens onto a disk, and feed light reflected from the disk back to the laser. A focus-error detector receives light reflected from the disk and produces a focus-error signal representing distance between the objective lens and the disk. A sample-and-hold circuit samples the focus-error signal when a peak-detect signal is produced, and outputs the sampled focus-error signal as a reference signal. A focus controller moves the objective lens toward or away from the disk according to the difference between the focus-error signal and the reference signal.

16 Claims, 6 Drawing Sheets

FOCUS ADJUSTMENT SYSTEM FOR OPTICAL DISK APPARATUS

BACKGROUND OF THE INVENTION

This invention relates to a focus adjustment system for an optical disk apparatus.

An optical disk apparatus is a device, such as a compact disk player, video disk player, optical image file, or an optical disk drive in a computer system, that focuses a light beam through an objective lens onto a rotating disk in order to reproduce information from, and in some cases to write information on, the disk. Focusing of the light beam must be accurately adjusted and controlled to keep the objective lens at the optimum distance from the surface of the disk, which may not rotate in a perfectly level plane.

Focus is generally controlled as follows: a focus error signal representing the distance between the objective lens and disk is detected; the focus error signal is compared with a reference signal corresponding to the in-focus point; and the objective lens is moved so as to reduced the difference between the focus-error signal and reference signal to zero. Many focus adjustment systems, differing in the ways in which the focus-error signal is detected, are known from the prior art.

A problem with the prior-art systems is that the reference signal must be precisely adjusted when the optical disk apparatus is manufactured. This requires, for example, precise alignment of an optical system in order to focus light reflected from the disk onto the exact center of a split photodetector. It also requires the objective lens to be moved in relation to the disk by special test equipment to find in-focus point, and the reference signal to be adjusted precisely to the value of the focus-error signal at the in-focus position.

These alignments and adjustments are difficult to perform accurately, and tend to add to the time and cost of the manufacturing process. Furthermore, even if the focus adjustment system is precisely adjusted in the factory, there is no guarantee that it will remain in precise adjustment during the operating life of the optical disk apparatus. For example, mechanical stress may cause the light reflected from the disk to migrate to an off-center position on the photodetector, or aging of electronic components may cause the reference signal to vary, the result in either case being loss of focusing accuracy.

SUMMARY OF THE INVENTION

It is therefore an object of the present invention to adjust the focus of an optical disk apparatus accurately during operation without requiring precise alignment or adjustment during the manufacturing process.

Another object of the invention is to prevent degradation of focusing accuracy during the operating life of an optical disk apparatus.

A focus adjustment system has a laser for producing a light beam. An optical system directs the light beam through an objective lens onto a disk, and feeds light reflected from the disk back to the laser. A monitor detector receives part of the light beam and produces a monitor signal representing the beam power. A peak detector detects peak values of the monitor signal and produces a peak-detect signal when a peak value is detected. A focus-error detector receives light reflected from the disk and produces a focus-error signal. A sample-and-hold circuit samples the focus-error signal when a peak-detect signal is produced, and outputs the sampled focus-error signal as a reference signal. A focus controller moves the objective lens toward or away from the disk according to the difference between the focus-error signal and the reference signal.

BRIEF DESCRIPTION OF THE DRAWINGS

FIG. 5 is a graph illustrating the monitor signal when the laser is FIG. 1 is driven by a current having a high-frequency ac component.

DETAILED DESCRIPTION OF THE INVENTION

Two novel focus adjustment system for optical disk apparatus will be described with reference to the drawings. These focus adjustment system exemplify the present invention but do not restrict its scope, which should be determined solely from appended claims.

Figure 1:
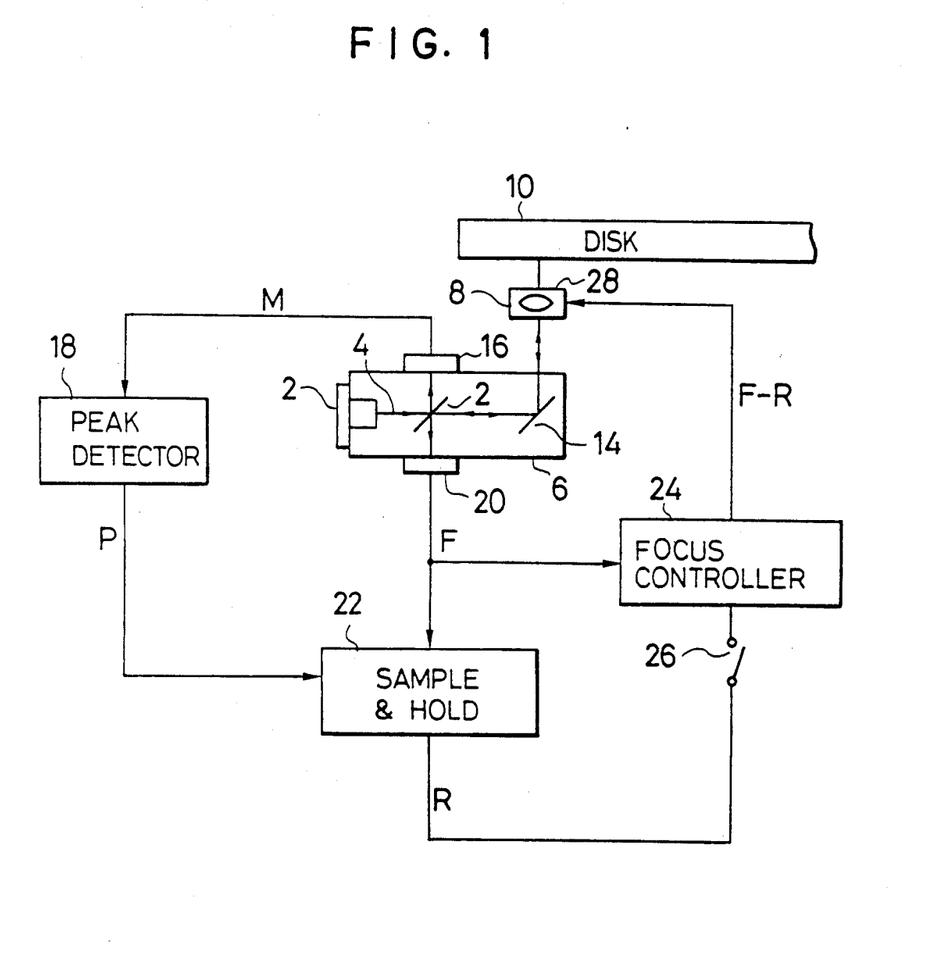
FIG. 1 is a block diagram illustrating a novel focus adjustment system for optical disk apparatus.

With reference to FIG. 1, the first novel focus adjustment system comprises a laser 2 for producing a light beam 4 which is transmitted through an optical system 6 and an objective lens 8 onto a disk 10. The laser 2 is, for example, a well-known semiconductor laser diode. The optical system 6 comprises, for example, a beam splitter 12, light incident on which is partly transmitted and partly reflected, and a mirror 14 for directing the transmitted part of the light beam 4 to the objective lens 8. The objective lens 8, which focuses the light beam 4 onto a spot on the disk 10, is movable for focusing control in a direction perpendicular to the disk 10.

Light reflected from the disk 10 returns on the same optical path and is fed back to the laser 2. Specifically, the reflected light passes through the objective lens 8, is reflected by the mirror 14 and partially transmitted by the beam splitter 12, and re-enters the laser 2 at the aperture from which it was originally emitted. This feedback of light reinforces the lasing action of the laser 2 and increases the output power of the light beam 4.

The part of the light beam 4 that is reflected at the beam splitter 12 is received by a monitor detector 16 comprising a photodiode that converts the received light to an electrical monitor signal M representing the power of the light beam 4. The monitor detector 16 is electrically coupled to a peak detector 18 which receives the monitor signal M and detects peak values of M, producing a peak-detect signal P when a peak value of M is detected.

Light reflected from the disk 10 is, in addition to being fed back to the laser 2, partially reflected at the beam splitter 12 to a focus-error detector 20, which converts the received light to a focus-error signal F representing the distance between the objective lens 8 and the disk 10. For example, F decreases if the distance between the objective lens 8 and the disk 10 is reduced, and increases if this distance is increased. Examples of explicit structures of the focus-error detector 20 will be shown later.

The peak detector 18 and the focus-error detector 20 are electrically coupled to a sample-and-hold circuit 22, which samples the focus-error signal F from the focus-error detector 20 when it receives a peak-detect signal P from the peak detector 18 and produces the sampled focus-error signal as a reference signal R.

A focus controller 24 is electrically coupled to the focus-error detector 20 and the sample-and-hold circuit 22, receiving the focus-error signal F from the focus-error detector 20, and receiving the reference signal R from the sample-and-hold circuit 22 through a switch 26. The focus controller 24 comprises, for example, a differential amplifier that produces a signal F−R representing the difference between the focus-error signal F and the reference signal R. The siganl F−R drives a device such as an electromagnetic coil 28 that moves the objective lens 8 in a direction perpendicular to the disk 10. For example, the electromagnetic coil 28 moves the objective lens 8 toward the disk 10 when F−R is positive, and away from the disk 10 when F−R is negative.

Next two examples of the structure of the focus-error detector 20 will be shown, embodying the astigmatic method and knife-edge method of focus-error detection. These methods are shown because they have been widely used in the prior art, but the invention is not restricted to these methods; other methods of producing a focus-error signal may be used instead.

Figure 2A:
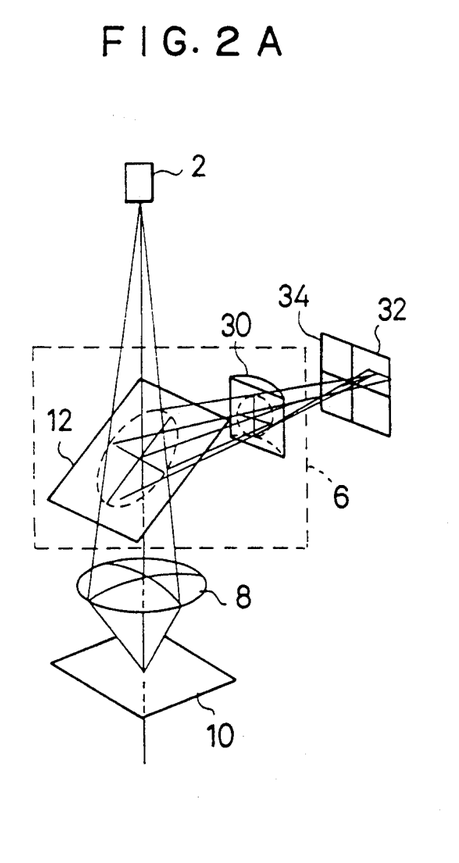
FIGS. 2A to 2D illustrate a method of producing the focus-error signal in FIG. 1.

FIG. 2A illustrates the structure of a focus-error detector 20 using the astigmatic method, also showing the optical system 6 and other related elements. To simplify the drawing the mirror 14 is omitted from the optical system 6, although of course it may be present. The optical system 6 has a cylindrical lens 30 which focuses light reflected from the disk 10 and the beam splitter 12 onto a quadrant photodetector 32 comprising four photodiodes 34. The focus-error detector 20 comprises this quadrant photodetector 32 and a differential amplifier 36 shown in FIG. 2B, the four photodiodes 34 being connected pairwise to the two inputs of the differential amplifier 36. The output of the differential amplifier 36 is the focus-error signal F.

Figure 2B:
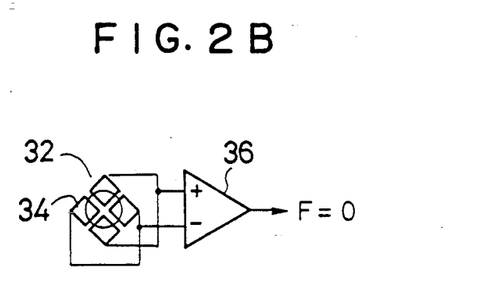
Figure 2C:
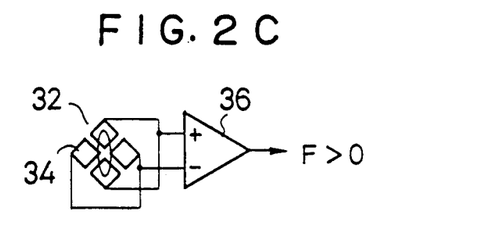
Figure 2D:
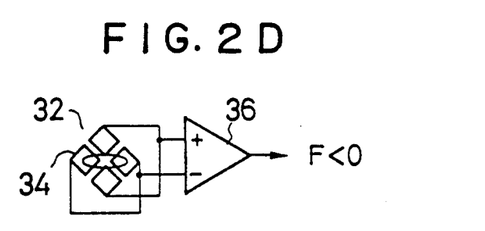

When the objective lens 8 is at a certain distance from the disk 10, the cylindrical lens 30 focuses the reflected light onto a substantially perfect circle on the quadrant photodetector 32 and the focus-error signal F is zero, as illustrated in FIG. 2B. If the objective lens 8 is farther from the disk 10, the reflected light is focused to a vertical ellipse, for example, and the focus-error signal F is greater than zero as illustrated in FIG. 2C. If the objective lens 8 is closer to the disk 10, the reflected light is focused to a horizontal ellipse and the focus-error signal F is less than zero, as illustrated in FIG. 2D.

Figure 3A:
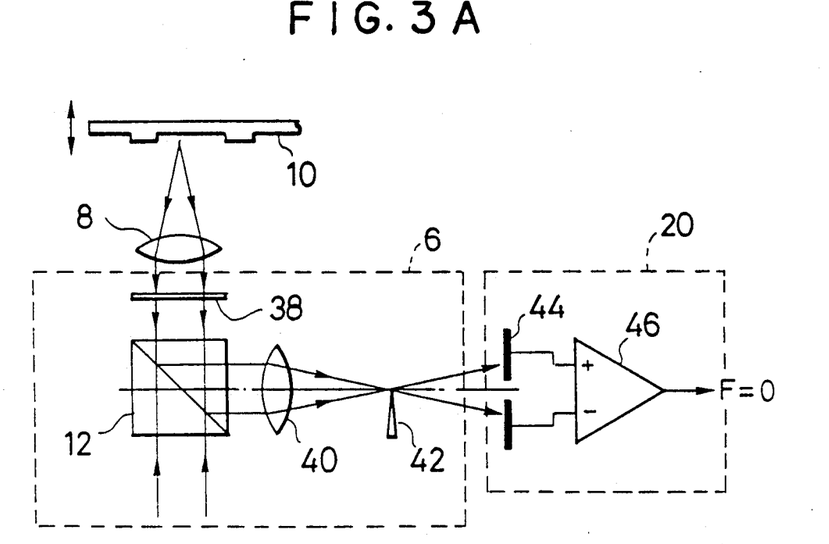
FIGS. 3A to 3C illustrate an alternative method of producing the focus-error signal in FIG. 1.

FIG. 3a illustrates the structure of a focus-error detector 20 using the knife-edge method, also showing the optical system 6 and other related elements. Once again the mirror 14 is omitted. The optical system 6 has a quarter wave plate 38 disposed between the objective lens 8 and the beam splitter 12, and a condenser lens 40 and a knife edge 42 disposed between the beam splitter 12 and the focus-error detector 20. The focus-error detector 20 comprises a split photodetector 44 having two photodiodes, and a differential amplifier 46 that receives the outputs of the two photodiodes in the split photodetector 44, amplifies their difference, and produces the result as the focus-error signal F.

Figure 3B:
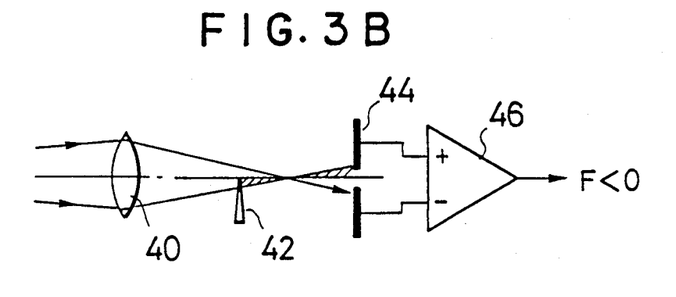
Figure 3C:
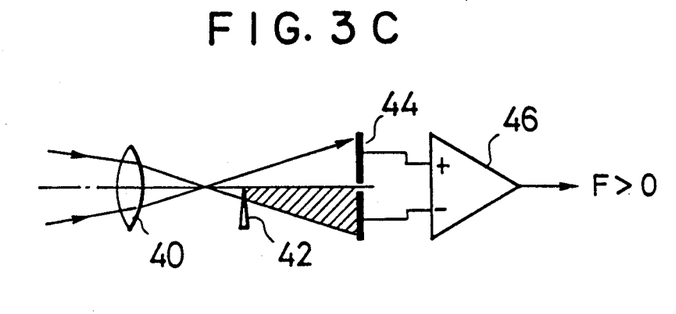

When the objective lens 8 is at a certain distance from the disk 10, the focal point of the condenser lens 40 is located exactly at the knife edge 42, so the knife edge 42 does not mask any light. The two photodiodes of the split photodetector 44 receive equal amounts of light and the focus-error signal F is zero, as shown in FIG. 3A. When the objective lens 8 is closer to the disk 10, the focal point moves past the knife edge 42, which now masks light to one part of the split photodetector 44, causing the focus-error signal F to be less than zero as shown in FIG. 3B. When the objective lens 8 is farther from the disk 10, the knife edge 42 masks light to the other part of the split photodetector 44 and the focus-error signal F is greater than zero as shown in FIG. 3C.

Detailed descriptions of the structure of the peak detector 18, the sample-and-hold circuit 22, and the focus controller 24 in FIG. 1 will be omitted since these are well-known electronic devices.

Next the operation of the focus adjustment system will be described with reference once again to FIG. 1.

When the disk 10 is inserted in the optical disk apparatus, first the switch 26 is opened, disconnecting the sample-and-hold circuit 22 from the focus controller 24. In place of the reference signal R, the focus controller 24 receives signals (not explicitly indicated in the drawing) that cause it to drive the objective lens 8 through substantially its full range of motion perpendicular to the disk 10. When the objective lens 8 is at the in-focus point and the light beam 4 is focused to a sharp spot on the disk 10, the maximum amount of light is fed back to the laser 2, reinforcing the lasing action to the maximum degree and yielding the maximum beam power. When the light beam 4 is defocused, the reflected light is also defocused and less of it re-enters the aperture of the laser 2, so the feedback effect is weakened and the power of the light beam 4 is reduced.

Accordingly, the monitor signal M takes on its maximum value when the objective lens 8 is at the in-focus point. At this point the peak detector 18 produces a peak-detect signal P, causing the sample-and-hold circuit 22 to sample and hold the value of the focus-error signal F. Thereafter, the sample-and-hold circuit 22 continues to output this value as the reference signal R, representing the value of F at the in-focus point.

After the reference signal R has been established in this way, the switch 26 is closed and the focus controller 24 operates according to R and F. When the objective lens 8 is at the in-focus point, the signal F−R is zero, so the electromagnetic coil 28 receives no energizing current and the objective lens 8 is not moved. If the objective lens 8 moves closer to the disk 10, F−R becomes negative, so the electromagnetic coil 28 is energized and moves the objective lens 8 farther away from the disk 10, back toward the in-focus point. If the objective lens 8 moves too far from the disk 10, F−R becomes positive, so the electromagnetic coil 28 moves the objective lens 8 closer to the disk 10, again toward the in-focus point. Accordingly, the objective lens 8 is maintained at substantially the in-focus point at all times.

One advantage of the novel focus adjustment system is that when the optical disk apparatus is manufactured, it is not necessary for the optical system 6 and the focus-error detector 20 to be aligned as accurately as in the prior art. For example, the spot of reflected light need not be precisely centered on the quadrant photodetector 32 in FIG. 2B or on the split photodetector 44 in FIG. 3A. Nor is it necessary for a precise reference value to be determined during the manufacturing process, because the optical disk apparatus generates its own reference signal R each time a disk is inserted.

A further advantage is that the focus adjustment system does not tend to get out of adjustment over time. If alterations in the optical system 6 with the passage of time cause the spot of reflected light to migrate on the focus-error detector 20, for example, the focus adjustment system responds by generating a different reference signal R, which still represents the point of optimum focus.

Next two refinements of the focus adjustment system in FIG. 1 will be described with reference to graphs shown in FIGS. 4 and 5. In both of these graphs distance between the objective lens 8 and the disk 10 is shown on the horizontal axis, and the voltage level of the monitor signal M on the vertical axis.

Figure 4:
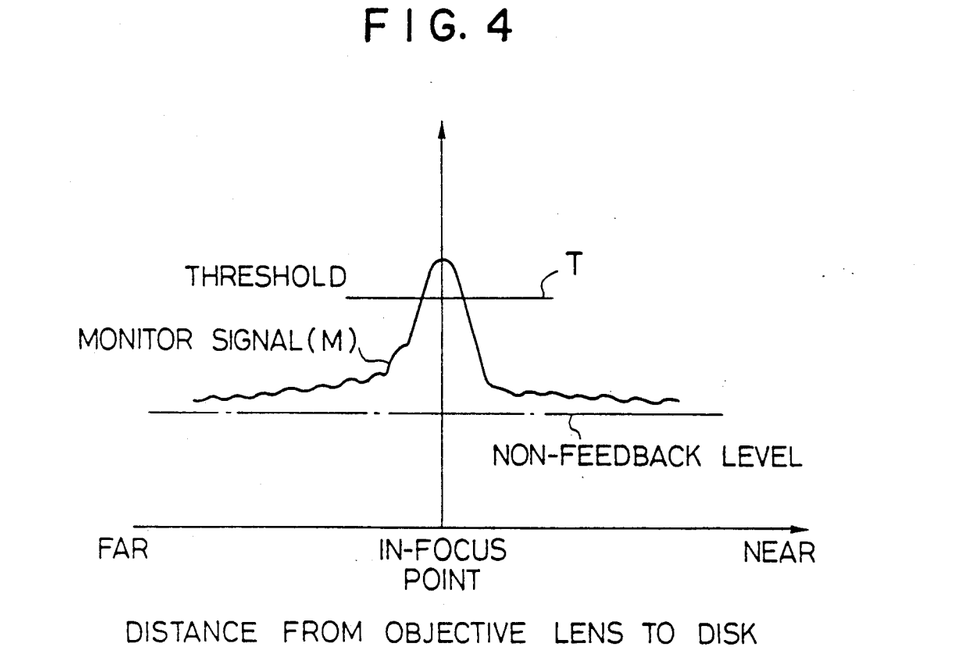
FIG. 4 is a graph illustrating the monitor signal in FIG. 1.
Figure 5:
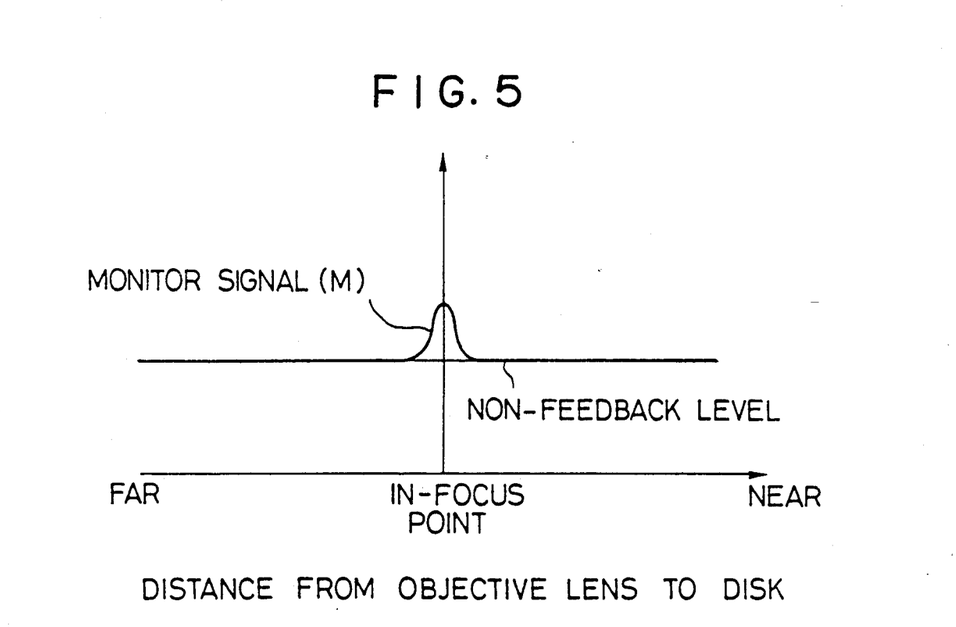

With reference to FIG. 4, if the laser 2 is driven by dc current, the level of the monitor signal M does not vary smoothly as the objective lens 8 moves in relation to the disk 10, but includes a certain amount of feedback-induced noise, such as undulations with a period equal to half the wavelength of the laser beam 4. To prevent detection of false peaks due to such noise, the peak detector 18 may be structured so as to detect peak values only when the monitor signal M exceeds a certain threshold, indicated by the horizontal line T. For example, the peak detector 18 may include a thresholding circuit that compares the monitor signal M with the threshold T and produces an internal enabling signal that enables output of the peak-detect signal P only when M exceeds T. Details of such a thresholding circuit will be obvious to one skilled in the art.

Alternatively, the current driving the laser 2 can be modulated by superimposition of an alternating current with an amplitude large enough to cross the lasing threshold. The ac component must have a frequency exceeding the frequency of any information recorded on the disk 10, preferably by a factor of five or more. For example, the driving current can be modulated at a frequency of 500 MHz. Such modulation is known to cause the beam power to vary smoothly as a function of the distance between the objective lens 8 and the disk 10, as shown in FIG. 5, for example. In this case the peak detector 18 does not require a thresholding circuit.

Next the second novel focus adjustment system will be described with reference to FIG. 6. Reference numerals in FIG. 6 identical to those in FIG. 1 denote identical or equivalent elements, explanations of which will be omitted. The only new element in FIG. 6 is a correction circuit 48 inserted between the sample-and-hold circuit 22 and the switch 26.

Figure 6:
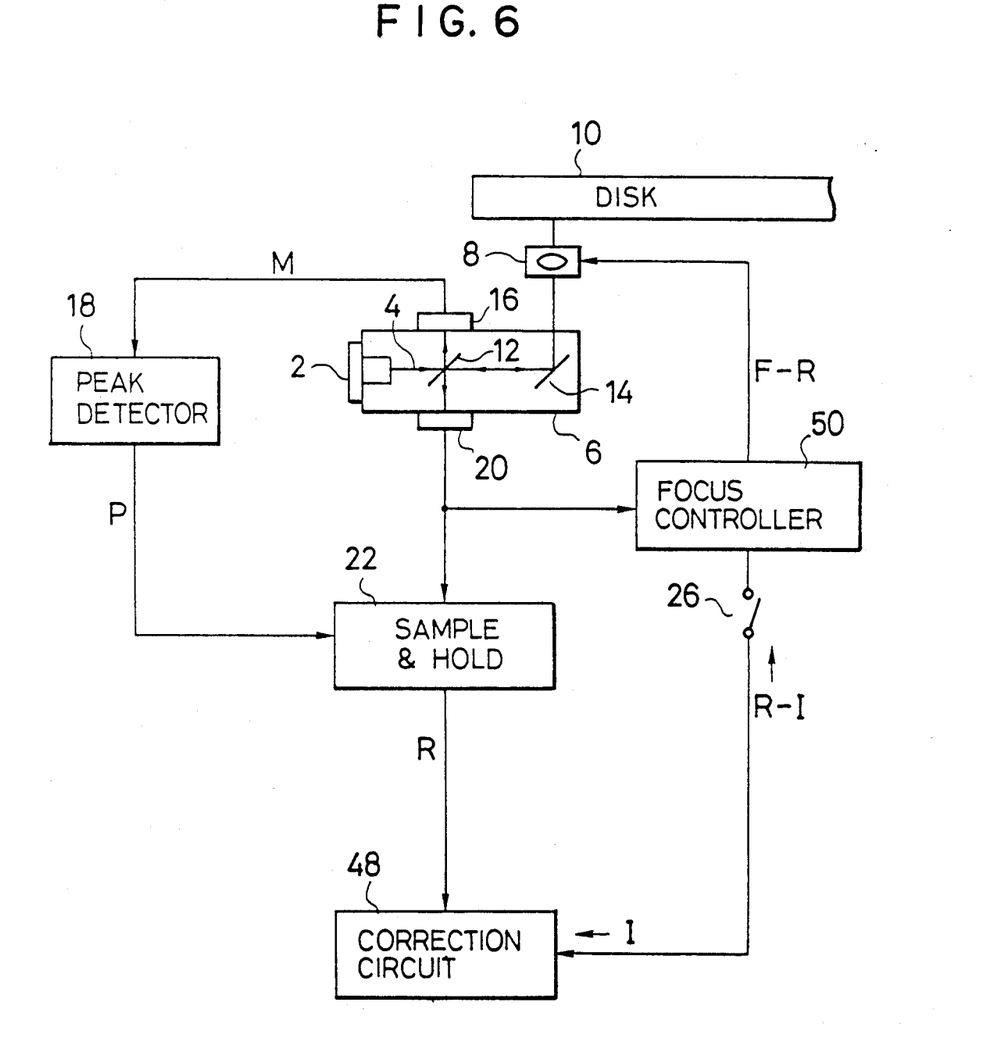
FIG. 6 is a block diagram illustrating another novel focus adjustment system.

The focus controller 50 in FIG. 6 includes a circuit (not explicitly shown) for generating an initial reference signal I approximately equal to the value of the focus-error signal F at the in-focus point. The level of the initial reference signal I is set when the optical disk apparatus is manufactured, but it does not have to be adjusted with great precision.

When the disk 10 is inserted, before the switch 26 is opened, the focus controller 50 sends the initial reference signal I to the correction circuit 48. After the objective lens 8 has been driven through its range of motion and the reference signal R has been established, the correction circuit 48 determines a correction signal R−I equal to the difference between the reference signal R and the initial reference signal I. Then when the switch 26 is closed, the correction circuit 48 supplies the correction signal R−I to the focus controller 50.

The focus controller 50 compares the focus-error signal F from the focus-error detector 20 with the initial reference signal I plus the correction signal R−I. Since $I+(R-I)=R$, this is equivalent to comparing F with R. The focus controller 50 accordingly produces the same signal F−R as in FIG. 1 and controls the motion of the objective lens 8 in the same way.

Figure 7:
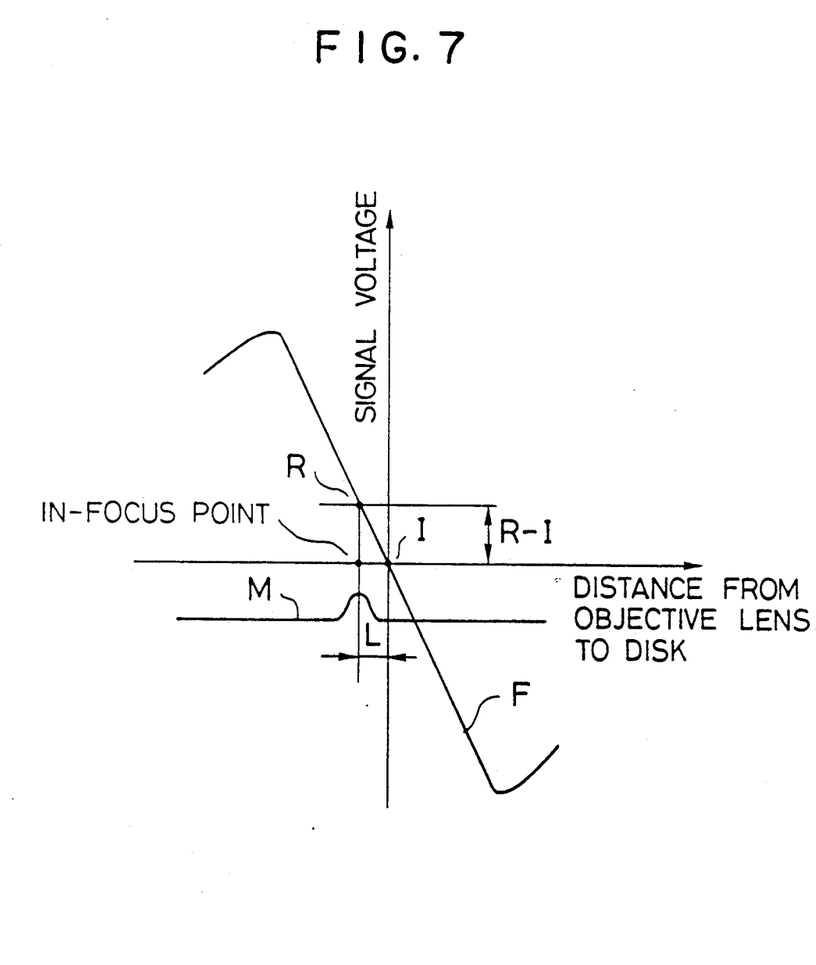
FIG. 7 is a graph describing the operation of the focus adjustment system in FIG. 6.

The graph in FIG. 7 illustrates the operation of the focus adjustment system in FIG. 6. The horizontal axis represents distance between the objective lens 8 and the disk 10. The vertical axis represents the voltage levels of the monitor signal M, the focus-error signal F, and the initial reference signal I. As the objective lens 8 traverses its range of motion, the focus-error signal varies on the curve F. When the monitor signal M reaches its maximum value, indicating that the objective lens 8 is at the in-focus point, the value of F is sampled and held as the reference signal R, enabling the correction signal R−I to be determined. Afterward, the objective lens 8 is controlled to hold F at $I+(R-I)=R$. The correction signal R−I thus compensates for the difference L between the in-focus point and the point indicated by the initial reference signal I.

The signal line carrying the initial reference signal I from the focus controller 50 to the correction circuit 48 and the correction signal R−I from the correction circuit 48 to the focus controller 50 in FIG. 6 may be a digital signal bus, in which case the correction circuit 48 comprises digital circuits for subtracting I from R and the focus controller 50 comprises digital circuits for adding R−I to I. These circuits may, for example, be incorporated in a microprocessor controlling the optical disk apparatus.

The focus adjustment system in FIG. 6 provides the same advantages as the focus adjustment system in FIG. 1. Another advantage is that the sample-and-hold circuit 22 does not have to hold a possibly large reference signal R for a long interval of time.

The novel focus adjustment systems described above can be modified in other ways, which will be apparent to one skilled in the art, without departing from the spirit and scope of this invention. For example, the correction signal in the second novel focus adjustment system may be determined as I−R, in which case it should be subtracted from the initial reference signal I to produce R. When the disk is inserted, the objective lens 8 need not be driven through its entire range of motion, but only until the peak of the monitor signal M is detected. The monitor signal M can be produced by detecting, not the light beam 4 emitted toward the objective lens 8, but a light beam emitted in the opposite direction from the rear facet of the laser 2. The peak detector 18 can be linked to the switch 26 and disabled when the switch 26 is closed, so that peak-detect signals P are not produced at this time.

What is claimed is:

1. A focus adjustment system for maintaining an objective lens at an optimum-focus distance from a disk in an optical disk apparatus, comprising:
   a laser for producing a light beam;
   an optical system for directing said light beam through said objective lens onto said disk, and feeding light reflected from said disk back to said laser;

a monitor detector for receiving part of said light beam and producing a monitor signal representing power of said light beam;

a peak detector, connected to said monitor detector, for detecting peak values of said monitor signal and producing a peak-detect signal when a peak value is detected;

a focus-error detector for receiving light reflected from said disk and producing a focus-error signal representing distance between said objective lens and said disk;

a sample-and-hold circuit connected to said focus-error detector and said peak detector, for sampling said focus-error signal when said peak-detect signal is produced, and producing the sampled focus-error signal as a reference signal; and a focus controller connected to said focus-error detector and said sample-and-hold circuit, for moving said objective lens toward or away from said disk according to a difference between said focus-error signal and said reference signal.

2. The system of claim 1, further comprising a switch for disconnecting said sample-and-hold circuit from said focus controller during detection of said peak value.

3. The system of claim 1, wherein said peak detector detects peak values only when said monitor signal is above a certain threshold.

4. The system of claim 1, wherein said laser is driven by a current modulated at a frequency exceeding frequencies of information recorded on said disk.

5. The system of claim 1, wherein said focus controller generates an initial reference value, further comprising:

a correction circuit connected between said sample-and-hold circuit and said focus controller, for determining a correction signal equal to a difference between said reference signal and said initial reference signal, and supplying said correction signal to said focus controller.

6. The system of claim 5, further comprising a switch for disconnecting said correction circuit from said focus controller during detection of said peak value.

7. The system of claim 1, wherein said optical system comprises a beam splitter for dividing said light beam into a part transmitted to said objective lens and a part reflected to said monitor detector, and dividing light reflected from said disk into a part transmitted to said laser and a part reflected to said focus-error detector.

8. The system of claim 7, wherein said optical system comprises a knife-edge for partially masking light reflected to said focus-error detector, and said focus-error detector comprises a split photodetector.

9. The system of claim 7, wherein said optical system comprises a cylindrical lens for astigmatically focusing light reflected to said focus-error detector, and said focus-error detector comprises a quadrant photodetector.

10. A method of adjusting the focus of an optical disk apparatus, comprising steps of:
(a) directing a light beam from a laser through an objective lens onto a disk;
(b) feeding light reflected from said disk back to said laser;
(c) moving said objective lens in a direction perpendicular to said disk;
(d) monitoring said light beam and detecting a peak power value thereof;
(e) detecting light reflected from said disk and producing a focus-error signal;
(f) sampling said focus-error signal when said peak power value is detected, thus obtaining a reference signal;
(g) moving said objective lens toward or away from said disk according to a difference between said focus-error signal and said reference signal.

11. The method of claim 10, wherein steps (c) to (f) are performed upon insertion of said disk into said optical disk apparatus.

12. The method of claim 10, wherein said peak power value is detected only above a certain threshold.

13. The method of claim 10, wherein said laser is driven by a current modulated at a frequency exceeding frequencies of information recorded on said disk.

14. The method of claim 10, also comprising steps of:
(h) generating an initial reference signal; and
(i) determining a difference between said reference signal and said initial reference signal, thereby producing a correction signal.

15. The method of claim 10, wherein said focus-error signal is produced by a knife-edge method.

16. The method of claim 10, wherein said focus-error signal is produced by an astigmatic method.

* * * * *